United States Patent [19]

Wu et al.

[11] Patent Number: 4,741,744

[45] Date of Patent: May 3, 1988

[54] HYDRATED METAL IONOMER MEMBRANES FOR GAS SEPARATION

[75] Inventors: Marinda L. Wu, San Ramon, Calif.; Terry D. Gordon, Angleton; Charles W. Martin, Lake Jackson, both of Tex.

[73] Assignee: The Dow Chemical Company, Midland, Mich.

[21] Appl. No.: 18,093

[22] Filed: Feb. 20, 1987

[51] Int. Cl.$^4$ .............................................. B01D 53/22
[52] U.S. Cl. ........................................ 55/16; 55/68; 55/73
[58] Field of Search .................. 55/16, 68, 158; 210/500.25

[56] References Cited

U.S. PATENT DOCUMENTS

| | | | |
|---|---|---|---|
| 3,735,558 | 5/1973 | Skarstrom et al. | 55/16 |
| 3,770,567 | 11/1973 | Grot . | |
| 3,780,496 | 12/1973 | Ward, III et al. | 55/16 |
| 3,847,672 | 11/1974 | Trocciola et al. | 55/16 X |
| 3,864,418 | 2/1975 | Hughes et al. | 55/16 X |
| 4,054,707 | 10/1977 | Quentin . | |
| 4,106,920 | 8/1978 | Hughes et al. | 55/16 X |
| 4,228,205 | 10/1980 | Hudecek et al. | 55/16 X |
| 4,318,714 | 3/1982 | Kimura et al. | 55/16 |
| 4,318,785 | 3/1982 | Gunjima et al. | 210/500.25 X |
| 4,427,419 | 1/1984 | Li | 55/16 |
| 4,433,082 | 2/1984 | Grot . | |
| 4,461,847 | 7/1984 | Hudecek et al. | 55/16 X |
| 4,515,761 | 5/1985 | Plotzker | 55/16 X |
| 4,614,524 | 9/1986 | Kraus | 55/16 |
| 4,666,468 | 5/1987 | Wu | 55/16 |

FOREIGN PATENT DOCUMENTS

| | | | |
|---|---|---|---|
| 122049 | 10/1984 | European Pat. Off. | 55/158 |
| 2907188 | 8/1979 | Fed. Rep. of Germany | 55/158 |
| 10199 | 3/1977 | Japan | 55/158 |
| 98706 | 6/1984 | Japan | 55/158 |
| 135434 | 7/1985 | Japan | 55/158 |
| 2139110 | 11/1984 | United Kingdom | 55/16 |

OTHER PUBLICATIONS

J. D. Way et al., Facilitated Transport of $CO_2$ in Ion Exchange Membranes, 1985 Pacific Conf. on Chem. & Spectroscopy, Oct. 9-11, 1985.

Am. Ind. Hyg. Assoc. J. 44(8): 592-599 (1983), Langhorst, A Hollow Fiber Device for Separating Water Vapor from Organic Vapors.

*Primary Examiner*—Robert Spitzer

[57] ABSTRACT

The invention relates to a process of separating gases using a membrane fabricated from a polymer containing a perfluorinated backbone and pendant hydrated metal ionomer groups wherein the pendant hydrated metal ionomer groups contain cations of alkali metals, alkaline earth metals, or transition metals bound to $SO_3^-$. The hydrated membranes have improved gas permeabilities with comparable gas selectivities over the unhydrated membranes. The membranes may be used to separate gas mixtures containing such gases as carbon dioxide and methane.

11 Claims, No Drawings

HYDRATED METAL IONOMER MEMBRANES FOR GAS SEPARATION

BACKGROUND OF THE INVENTION

This invention relates to a new method of separating gases using a membrane fabricated from polymers containing a perfluorinated backbone and pendant hydrated metal ionomer moieties, wherein the pendant hydrated metal ionomer moieties are comprised of metal hydrates of alkali metals, alkaline earth metals, or transition metals bound to $-SO_3^-$.

Membranes have been used to recover or isolate a variety of gases, including hydrogen, helium, oxygen, nitrogen, carbon dioxide, hydrogen sulfide, methane, and light hydrocarbons. Particular applications of interest include the separation of carbon dioxide from light hydrocarbons or other crude oil components as part of the tertiary oil recovery process. In other embodiments, nitrogen or helium is separated from natural gas. Other applications include the recovery of an enriched oxygen stream from air for use in enhanced combustion processes. Alternately, an enriched nitrogen stream may be obtained from air for use as an inert atmosphere over flammable fluids or for food storage.

To separate a gas mixture into two portions, one richer and one leaner in at least one component, the mixture is brought into contact with one side of a semipermeable membrane through which at least one of the gaseous components selectively permeates. A gaseous component which selectively permeates through the membrane passes through the membrane more rapidly than the other component(s) of the mixture. The gas mixture is thereby separated into a stream which is enriched in the selectively permeating component(s) and a stream which is depleted in the selectively permeating component(s). The stream which is depleted in the selectively permeating component(s) is enriched in the relatively nonpermeating component(s). A relatively nonpermeating component permeates more slowly through the membrane than the other component(s). An appropriate membrane material is chosen for the mixture at hand so that some degree of separation of the gas mixture can be achieved.

Membranes are fabricated from a wide variety of polymeric materials. An ideal gas separation membrane possesses a high separation factor (selectivity), high gas permeability, and good temperature and chemical resistance. An ideal membrane also possesses good mechanical properties, that is, resistance to crazing or cracking and minimal creep, under conditions of use. The problem is finding membrane materials which possess all the desired characteristics. Polymers possessing high separation factors generally have low gas permeabilities, while those polymers possessing high gas permeabilities generally have low separation factors. In the past, a choice between a high separation factor and a high gas permeability has been unavoidably necessary. Furthermore, when most polymer membranes are plasticized upon exposure to certain gases and liquids, the gas permeability of the membrane increases with a corresponding decrease in selectivity. A polymer membrane which maintains or improves in selectivity upon plasticization is desired.

SUMMARY OF THE INVENTION

This invention relates to a method of separating gases comprising (a) contacting with a feed gas mixture under pressure one side of a semipermeable membrane fabricated from a polymer containing a perfluorinated backbone and pendant hydrated metal ionomer moieties, wherein the pendant hydrated metal ionomer moieties are comprised of hydrated metals of alkali metals, alkaline earth metals, and transition metals bound to $-SO_3^-$;

(b) maintaining a pressure differential across the membrane under conditions such that a component(s) of the feed gas mixture selectively permeates through the membrane from the high pressure side to the low pressure side of the membrane;

(c) removing the permeated gas which is enriched in the faster permeating component(s) from the low pressure side of the membrane; while (d) removing the nonpermeated gas which is depleted in the faster permeating component(s) from the high pressure side of the membrane.

The invention uses membranes which possess high gas permeabilities and high gas selectivities to separate carbon dioxide from methane and various components from other gas mixtures. The membranes have good mechanical properties such as tensile strength, resistance to crazing or cracking, and resistance to creep under conditions of use. The membranes further possess good temperature and chemical resistance.

DETAILED DESCRIPTION OF THE INVENTION

Membranes useful in this invention are fabricated from polymers containing a perfluorinated backbone and pendant hydrated metal ionomer moieties, wherein the pendant hydrated metal ionomer moieties are comprised of hydrated metals of alkali metals, alkaline earth metals, or transition metals bound to $-SO_3^-$. A polymer with a perfluorinated backbone refers to a polymer which contains carbon to carbon bonds in the main polymer chain and requisite fluorine or carbon apart from the pendant hydrated metal ionomer moieties. A pendant metal ionomer moiety as used herein refers to a metal cation which is bound to a pendant $-SO_3^-$ group, that is, a $-SO_3^-$ group which is bound directly or indirectly to a carbon in the main polymer chain. A hydrated metal ionomer moiety refers to a metal cation to which are bound water molecules, forming a coordination complex with the metal cation as the central species.

The membranes useful in this invention are preferably comprised of polymers containing units in the backbone which are described by formula (1):

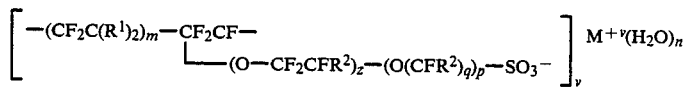

wherein
R$^1$ is independently in each occurrence fluorine or a C$_{1-10}$ perfluoroalkyl group;
R$^2$ is independently in each occurrence fluorine, $-CF_2Cl$, or a C$_{1-10}$ perfluoroalkyl group;

M is an alkali metal, an alkaline earth metal, or a transition metal;

z is individually in each occurrence an integer from about 0 to about 6;

m is individually in each occurrence a positive real number from about 1 to about 15;

p is individually in each occurrence an integer from about 0 to about 16;

q is individually in each occurrence an integer from about 1 to about 16; and n is individually in each occurrence an integer from about 1 up to an integer which represents the equilibrium hydration of the metal ionomer.

In formula (1) above, $R^1$ is preferably fluorine or a $C_{1-3}$ perfluorocarbon; more preferably $R^1$ is fluorine or a trifluoromethyl group; most preferably $R^1$ is fluorine. $R^2$ is preferably fluorine, $-CF_2Cl$ or a $C_{1-3}$ perfluorocarbon, more preferably fluorine or trifluoromethyl, and most preferably fluorine. z is preferably from about 0 to about 2. q is preferably from about 1 to about 6; q is more preferably from about 2 to about 4. Preferably m is from about 3 to about 10. p is preferably from about 0 to about 6, more preferably from about 0 to about 2.

M is preferably a transition metal, more preferably transition metals of the first row, most preferably copper, nickel, zinc, iron, manganese, titanium, chromium, or cobalt.

In the embodiments where oxygen is separated from nitrogen or nitrogen is separated from methane, M is preferably tungsten, osmium, iridium, palladium, platinum, titanium, vanadium, chromium, zinc, zirconium, molybdenum, ruthenium, manganese, iron, cobalt, or copper; more preferably M is titanium, vanadium, chromium, zinc, zirconium, molybdenum, ruthenium, manganese, iron, cobalt, or copper; most preferably M is manganese, iron, cobalt, or copper.

In the embodiments where carbon dioxide or carbon monoxide is separated from hydrogen, methane, or other light hydrocarbons, M is preferably tungsten, osmium, iridium, rhenium, platinum, mercury, thorium, rhodium, palladium, titanium, chromium, zinc, molybdenum, ruthenium, manganese, iron, cobalt, nickel, or copper; M is more preferably molybdenum, ruthenium, rhodium, palladium, titanium, chromium, manganese, iron, cobalt, nickel, copper, zinc; most preferably M is titanium, chromium, manganese, iron, cobalt, nickel, copper, or zinc.

In the embodiments where hydrogen is separated from methane or other light hydrocarbons or where olefins are separated from light hydrocarbons, M is preferably osmium, iridium, platinum, mercury, ruthenium, rhodium, palladium, tin, titanium, chromium, manganese, iron, cobalt, nickel, copper, or silver; more preferably M is ruthenium, rhodium, palladium, tin, titanium, chromium, manganese, iron, cobalt, nickel, copper, or silver; most preferably M is titanium, chromium, manganese, iron, cobalt, nickel, copper, or silver.

n is preferably from about 2 to about 16, more preferably from about 4 to about 10.

The polymers useful in the process of this invention are those which have sufficient tensile strength under operating conditions of temperature, pressure, and the like. Preferably, the equivalent weight of such polymers is between about 500 and 2000, more preferably between about 700 and 1500, most preferably between about 750 and 1250.

The polymers useful in this invention may be prepared by polymerizing a monomer of formula (2) with a monomer of formula (3). The polymers are converted to the metal ionomer form and then hydrated.

$$CF_2=C(R^1)_2 \text{ formula} \tag{2}$$

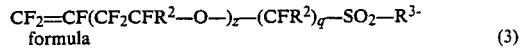

$$CF_2=CF(CF_2CFR^2-O-)_z-(CFR^2)_q-SO_2-R^3 \text{ formula} \tag{3}$$

wherein $R^1$, $R^2$, z, and q are as hereinbefore described and $R^3$ is a halogen or $-OX$. X is an alkali metal. In formula (3) above, $R^3$ is preferably a halogen, more preferably fluorine.

Such polymerization processes are known in the art and are described by U.S. Pat. Nos. 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; and 4,478,695; incorporated herein by reference. Further descriptions of such polymerization processes are contained in M. Seko, S. Ogawa, and K. Kimoto, "Perfluorocarboxylic Acid Membrane and Membrane Chlor-Alkali Process Developed by Asahi Chemical Industry," Perfluorinated Ionomer Membranes, ACS Symposium Series No. 180, American Chemical Society, Washington D.C., 1982, pp. 365–410.

A preferred method of producing the polymer is by emulsion polymerization. The polymerization is performed in an aqueous emulsion of one or both of the monomers. The monomers in the emulsion are contacted with a free radical initiator, a buffer, and a surfactant. The buffer is capable of maintaining the emulsion at a neutral pH, preferably at a pH of about 6. The surfactant is capable of supplying micelles wherein polymer formation may begin. The surfactant also is capable of stabilizing the polymer emulsion in the latex form throughout the reaction. The polymerization is preferably performed in semibatch mode. The solid reactants are charged to the reactor; water is added; and the reactor is pressurized with inert gas or with one of the monomers where such is gaseous. The initiator is then charged to the reactor if not previously charged. The reaction mixture is preferably agitated or stirred. The reaction temperature is preferably from about 20 degrees Celsius to 110 degrees Celsius, more preferably from about 40 degrees Celsius to 70 degrees Celsius. The pressure is preferably between about 1 and 30 atmospheres, more preferably between about 4 and 20 atmospheres. The reaction is continued until the desired degree of polymerization has occurred. Preferably the reaction is continued for about 5 minutes to 24 hours, more preferably from about 5 minutes to 2 hours.

The polymer may be recovered by acidifying the latex with an acid such as HCl. The polymer is washed separately with water and an alkanol, preferably methanol. The polymer is then dried at elevated temperatures, preferably under vacuum. One class of most preferred monomers for the emulsion reaction includes $CF_2=CF_2$ and $CF_2=CFOCF_2CF_2SO_2F$. Preferred buffers include $NaH_2PO_4$ and $Na_2HPO_4$. Preferred initiators are $Na_2S_2O_8$, $(NH_4)_2S_2O_8$, and $Na_2HPO_4$. Preferred surfactants include $NH_4CO_2(CF_2)_6CF_3$ or an alkali metal salt thereof.

In the embodiment wherein $R^3$ is fluorine, the polymer is converted to the hydrolyzed form by contacting with aqueous alkali metal hydroxide under conditions such that the SO₂F units undergo hydrolysis. The acid form of the polymer is prepared by contacting the hydrolyzed form of the polymer with concentrated (about 6 N) hydrochloric acid at elevated temperatures of about 90 degrees Celsius.

The desired metal ionomer form of the polymer is obtained by contacting either the hydrolyzed form or the acid form of the polymer with an aqueous salt solution of the appropriate metal cation. The polymer may be contacted with a solution containing a mixture of metal salts to obtain mixed metal ionomers of the polymer. The contacting of the po.lymer with the aqueous metal salt solution is performed under conditions such that the metal cations are exchanged with the protons in the pendant ionomer groups of the polymer. Preferred metal salts which may be used are metal nitrates, metal halides, metal sulfates, metal acetates, and the like. Aqueous solutions of metal salts which have concentrations up to the solubility limit of the metal salts may be used. The concentration of the metal salts in solution is preferably from about 0.5 to about 35 weight percent, more preferably from about 0.5 to about 25 weight percent. Contact times of the solution with the polymer preferably range from about 1 to about 72 hours. Solution temperatures preferably range from about 20 degrees Celsius to 90 degrees Celsius. Thereafter the membrane is rinsed. The transition metal ionomer form of the polymer may alternatively be obtained through a two step conversion processing by first converting the hydrolyzed or acid form of the polymer to the alkali metal ionomer intermediate.

The cations of alkali metals, alkaline earth metals, or transition metals are exchanged with protons in the pendant ionomer species in the polymer. The exchange of metal cations for protons may be partial or complete. The degree of metal cation exchange need only be sufficient to impart the desired gas separation performance in the fabricated membrane. Preferably the metal ionomer form of the membrane after the exchange contains from about 0.5 to 40 weight percent metal cation, more preferably from about 2 to 35 weight percent metal cation.

The membranes are preferably formed in the sulfonyl halide form, thereafter hydrolyzed, and then metal cation exchanged to obtain the desired metal ionomer species of the polymer. The membranes are preferably formed into films or hollow fibers by extruding at temperatures of from about 175 degrees Celsius to 350 degrees Celsius.

Alternatively, the membranes may be solution or dispersion cast from the acid or metal ionomer form of the polymer. Such a method is described in U.S. Pat. No. 4,433,082, incorporated herein by reference. A preferred method of solution casting membranes from the polymer is described in commonly assigned U.S. patent application Ser. No. 739,931, filed May 31, 1985, incorporated herein by reference. A preferred method of dispersion casting membranes is described in commonly assigned U.S. patent application Ser. No. 739,955, filed May 31, 1985, incorporated herein by reference.

In dispersion casting, up to 0.5 weight percent of the polymer is dissolved in a solvent corresponding to formula (4):

 (4)

wherein P is fluorine, chlorine, bromine, or iodine; $P^1$ is chlorine, bromine, or iodine; Q and T are independently in each occurrence hydrogen, fluorine, chlorine, bromine, iodine, or $R^4$; $R^4$ is $C_{1-6}$ perfluoroalkyl or chlorinated $C_{1-6}$ perfluorine alkyl. Preferably, P and $P^1$ are bromine; Q and T are preferably fluorine. Preferred solvents have a boiling point of less than about 110 degrees Celsius, a density of between about 1.0 and about 3.0 grams/centimeter³, and a solubility parameter of between about 7.0 and about 12.0 Hildebrands. In dispersion casting, between about 0.1 and 50 weight percent of the polymer is dispersed in the above described solvent. The preferred solvent is FREON 113* fluorocarbon solvent (*trademark of E. I. Dupont de Nemours & Company).

The polymer solution or dispersion is then cast on a surface. The membrane which is so formed may be homogeneous. The membrane solution may be cast onto a support surface which may be dissolved away from the finished membrane following drying and curing of the membrane. Alternately, the membrane solution may be cast onto a support such as silicone, coated glass, or other material which has a low surface energy from which the membrane is separated following drying and curing. Such membrane casting techniques are known to one skilled in the art. Casting techniques are discussed in Robert Kesting, *Synthetic Polymer Membranes*, 2nd edition, John Wiley & Sons, New York, 1985, incorporated herein by reference.

To form a composite membrane, a thin discriminating layer can be formed and thereafter adhered to a support. Alternately, the membrane may be cast directly onto a support. The support may be porous or nonporous; preferably the support is porous so that the substrate presents minimal resistance to gas transport through the composite membrane. Any polymeric material to which the polymer will adhere, which possesses sufficient mechanical properties under membrane use conditions, and which does not unduly interfere with gas transport through the composite membrane may be used as a substrate for the composite membrane. The surface of the substrate may be pretreated to enhance adhesion by techniques known to one skilled in the art. Examples of preferred substrates include cellulose esters, polysulfones, polyethersulfones, polyamides, polyolefens, polyurethanes, polyimides, polyetherimides, polyesters, and the like.

Once the membrane is formed and converted to the desired metal ionomer form, the membrane is partially or fully hydrated. The membrane may be hydrated prior to or subsequent to fabrication into a device. The membrane may be hydrated in several ways, including soaking in water at ambient temperatures for about ¼ to 48 hours. Alternately, the membrane may be contacted with boiling water for about 5 to 60 minutes. The membrane also may be hydrated by contacting with a stream of humidified gas for about 6 to 172 hours. The humidified gas stream preferably has a relative humidity of at least about 30 percent, more preferably at least about 50 percent, most preferably at least about 90 percent. The contact time for the membrane with the humidified stream is preferably increased as the relative humidity of the stream is decreased.

The extent of hydration of the metal ionomer form of the membrane is preferably at least about 10 percent, more preferably at least about 50 percent, most preferably at least about 80 percent.

The membranes are fabricated into flat sheet, spiral, tubular, or hollow fiber devices by methods described in the art. The membranes used in the invention are relatively thin. The thickness of such membranes is preferably greater than about 10 microns and less than about 500 microns. More preferably, the membrane thickness is between about 25 and about 300 microns. In the case of composite or asymmetric membranes, the active discriminating layer is preferably between about 0.1 and 100 microns, more preferably between about 0.1 and 10 microns. The membranes are sealingly mounted in a pressure vessel in such a manner that the membrane separates the vessel into two fluid regions wherein fluid flow between the two regions is accomplished by fluid permeating through the membrane. For examples of conventional membrane device designs and fabrication methods see U.S. Pat. Nos. 3,228,876; 3,433,008; 3,455,460; 3,475,331; 3,526,001; 3,538,553; 3,690,465; 3,702,658; 3,755,034; 3,801,401; 3,872,014; 3,966,616; 4,045,851; 4,061,574; 4,080,296; 4,083,780; 4,220,535; 4,235,723; 4,265,763; 4,430,219; 4,352,092; 4,337,139; and 4,315,819; incorporated herein by reference.

The membranes are used to isolate or recover gases from gas mixtures. The feed gas mixtures may contain gases such as hydrogen, helium, oxygen, nitrogen, carbon dioxide, hydrogen sulfide, methane, light hydrocarbons, and the like. One side of the membrane is contacted with a feed gas mixture under pressure, while a pressure differential is maintained across the membrane. To be useful, at least one of the components in any given gas mixture selectively passes through the membrane more rapidly than the other component(s). A stream is obtained on the low pressure side of the membrane which is enriched in the faster permeating component. The permeated gas is removed from the low pressure (downstream) side of the membrane. A stream depleted in the faster permeating gas is withdrawn from the high pressure (upstream) side of the membrane. In the case where carbon dioxide is separated from methane, carbon dioxide selectively permeates through the membrane. The pressure differential across the membrane is preferably between about 5 and 1000 psig, more preferably between about 50 and 850 psig. The separation process should be carried out at temperatures which do not adversely affect membrane integrity. Such temperatures are those which do not substantially dehydrate the membrane. Under continuous operation, the operating temperature is preferably in the range of from about 0 to 150 degrees Celsius, more preferably from about 0 to 125 degrees Celsius, and most preferably from about 0 to 100 degrees Celsius.

Gas permeability is defined as $$P = \frac{(\text{amount of permeant})(\text{membrane thickness})}{(\text{area})(\text{time})(\text{driving force across the membrane})}.$$

A standard permeability measurement unit is $$\frac{(\text{centimeter }(STP))^3(\text{centimeter})}{(\text{centimeter})^2(\text{second})(\text{centimeter Hg})}$$

abbreviated hereinafter as $\frac{cm^3(STP)\ cm}{cm^2\ s\ cm\ Hg}$.

The separation factor (selectivity) is defined as the ratio of the permeability of the faster permeating gas to the permeability of the slower permeating gas.

The membrane preferably has a carbon dioxide permeability of at least about $8 \times 10(-10)$ cm$^3$ (STP) cm/(cm$^2$ s cmHg). The separation factor for carbon dioxide/methane is preferably at least about 10.

SPECIFIC EMBODIMENTS

The following examples are presented to illustrate the invention only and are not intended to limit the scope of the invention or claims. Various methods may be used to measure the permeation of gases through membranes. Literature sources describe such apparatus and measurement techniques. See *Methods of Experimental Physics*, Vol. 16c, Academic Press, Inc., 1980, pp. 315-377; Pye, Hoehn, and Panar, *Measurement of Gas Permeability of Polymers*. I. "Permeabilities in Constant Volume/Variable Pressure Apparatus", Journal of Applied Polymer Science, Vol. 20, 1976, pp. 1921-1931; Pye, Hoehn, and Panar, Measurement of Gas Permeability of Polymers. II. "Apparatus for Determination of Permeabilities of Mixed Gases and Vapors", *Journal of Applied Polymer Science*, Vol. 20, 1976, pp. 287-301; and ASTM-1434-75,513, "Standard Test Methods for Gas Transmission Rate of Plastic Film and Sheeting."

EXAMPLE 1

A NAFION* 125 fluoropolymer film (*trademark of DuPont de Nemours Company) in acid form, equivalent weight 1200, is equilibrated in a 0.75 molar Ni(NO$_3$)$_2$:6H$_2$O solution for about 48 hours at ambient temperature. The film is removed from the solution and placed in a constant-pressure variable-volume gas permeation apparatus that has a membrane sample size of about 3.9 or 11 centimeters in diameter. In the constant-pressure variable-volume method, the membrane sample is subjected to a humidified stream on the feed side of the membrane and atmospheric pressure on the downstream side of the membrane. The membrane is equilibrated with a fully humidified gas stream for about 24 to 72 hours before permeability measurements are recorded. Permeability values for carbon dioxide, methane, oxygen, and nitrogen are determined at ambient temperatures (about 25 degrees Celsius) with a 50 to 100 psig pressure differential across the membrane. Data are reported in Tables I and II.

EXAMPLE 2

A NAFION* 125 fluoropolymer film (*trademark of DuPont de Nemours Company) in acid form, equivalent weight 1200, is equilibrated in a 0.75 molar CuCl$_2$:2H$_2$O solution for about 48 hours at ambient temperature. The film is removed from the solution and placed in a constant-pressure variable-volume gas permeation apparatus. Permeability values for oxygen and nitrogen are determined as described in Example 1. Data are reported in Table II.

EXAMPLE 3

A fluropolymer (PFSA) prepared by copolymerization of tetrafluoroethylene with 3-oxaperfluoro-4-hexene sulfonyl fluoride, with an equivalent weight of about 850, is compression molded into a film at about 282 degrees Celsius. The film is hydrolyzed at 90 degrees Celsius for more than four hours in a solution made by dissolving about 20.2 grams of KOH in a mixture of about 26.6 milliliters of dimethyl sulfoxide with 73.4 milliliters of water. After thoroughly rinsing the film with deionized water, it is converted to the acid form by treatment with about 6 percent sulfuric acid. The film is then equilibrated in a 0.75 molar Ni(NO$_3$)$_2$:6-H$_2$O solution at about 25 degrees Celsius for about hours. Permeability measurements are determined using the carrier gas method with gas chromatographic analysis. In this method, a humidified gas stream is applied to the feed side of the membrane while the downstream side of the sample is subjected to a constant flow of dry helium carrier gas. The membrane is equilibrated with a fully humidified feed gas before steady state gas permeability measurements are recorded. To determine when equilibrium has been reached, permeability measurements are taken at periodic time intervals until the difference in permeability values is less than one percent. The gas permeabilities of carbon dioxide and methane are measured using a mixed gas feed. The data are acquired at ambient temperature (about 22 to 25 degrees Celsius) and with a 25 to 500 psig pressure differential across the membrane. The data are reported in Table III.

The data reported in Table III differ from that reported in Table I for several reasons. The membrane samples are fabricated from different polymers with different equivalent weights. The longer pendant side chains in the polymer of Example 1 result in different ion cluster sizes of about 50 Angstroms compared with about 20 to 30 Angstroms in Example 2. Such differences are believed to affect membrane separation performance. The permeability measurement methods used in the two examples are also different. The carrier gas method employing a dry sweep gas will tend to dehydrate the membrane more than the constant-pressure variable volume method used in Example 1. Therefore, the membrane samples will differ in their states of hydration. Furthermore, the permeability measurements in Example 2 are obtained using a mixed gas feed, while the permeability measurements in Example 1 are obtained using a single gas feed. The different temperatures and pressures used in the two examples will also contribute to differences in the gas separation performance of the membranes. Such differences in experimental methods and conditons are well know to affect membrane separation performance.

TABLE I $CO_2/CH_4$** SEPARATION PERFORMANCE OF HYDRATED NAFION* METAL IONOMER MEMBRANES

| Membrane | Permeability $cm^3(STP)cm \times 10^{10}$ $cm^2 s$ cm Hg | | Separation Factor |
|---|---|---|---|
| | $CO_2$ | $CH_4$ | $CO_2/CH_4$ |
| NAFION* ($Ni^{+2}$) | 12.9 | 0.46 | 28 |
| NAFION* ($Ni^{+2}/H_2O$) | 34.4 | 0.68 | 51 |

**data based on single gas measurements

TABLE II $O_2/N_2$** SEPARATION PERFORMANCE OF HYDRATED NAFION* METAL IONOMER MEMBRANES

| Membrane | Permeability $cm^3(STP)cm \times 10^{10}$ $cm^2 s$ cm Hg | | Separation Factor |
|---|---|---|---|
| | $O_2$ | $N_2$ | $O_2/N_2$ |
| NAFION* ($Ni^{+2}$) | 2.0 | 0.80 | 2.5 |
| NAFION* ($Ni^{+2}/H_2O$) | 3.6 | 0.93 | 3.9 |
| NAFION* ($Cu^{+2}$) | 2.3 | 0.61 | 3.8 |
| NAFION* ($Cu^{+2}/H_2O$) | 7.0 | 0.70 | 10 |

**data based on single gas measurements

TABLE III $CO_2/CH_4$ SEPARATION PERFORMANCE OF HYDRATED PFSA METAL IONOMER MEMBRANES
Mixed Gas Test (50 mol % carbon dioxide/50 mol % methane)

| Membrane | Permeability $cm^3(STP)cm \times 10^{10}$ $cm^2 s$ cm Hg | | Separation Factor |
|---|---|---|---|
| | $CO_2$ | $CH_4$ | $CO_2/CH_4$ |
| PFSA ($Ni^{+2}$) | 2.49 | 0.069 | 36 |
| PFSA ($Ni^{+2}/H_2O$) | 43.8 | 1.38 | 32 |

What is claimed is:
1. A method of separating gases comprising
   (a) contacting with a feed gas mixture under pressure one side of a semipermeable membrane fabricated from a polymer containing a perfluorinated backbone and pendant hydrated metal ionomer groups, wherein the pendant hydrated metal ionomer groups are comprised of hydrated metals of alkali metals, alkaline earth metals, and transition metals bound to $-SO_3^-$;
   (b) maintaining a pressure differential across the membrane under conditions such that a component(s) of the feed gas selectively permeates through the membrane from the high pressure side to the low pressure side of the membrane;
   (c) removing the permeated gas which is enriched in the faster permeating component(s) from the low pressure side of the membrane; and
   (d) removing the nonpermeated gas which is depleted in the faster permeating component(s) from the high pressure side of the membrane.

2. The process of claim 1 wherein the membrane comprises from polymers containing units in the backbone described by formula (1):

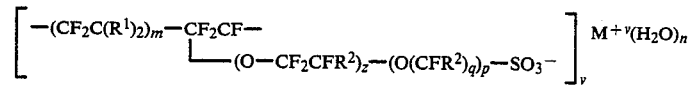

wherein
$R^1$ is independently in each occurrence fluorine or a $C_{1-10}$ perfluoroalkyl group;
$R^2$ is independently in each occurrence fluorine, $-CF_2Cl$, or a $C_{1-10}$ perfluoroalkyl group;
M is an alkali metal, an alkaline earth metal, or a transition metal;
z is individually in each occurrence an integer from about 0 to about 6;
m is individually in each occurrence a positive real number from about 1 to about 15;
p is individually in each occurrence an integer from about 0 to about 16;
q is individually in each occurrence an integer from about 1 to about 16; and n is individually in each occurrence an integer from about 1 up to an integer which represents the equilibrium hydration of the metal ionomer.

3. The method of claim 2 wherein z is an integer of from about 0 to about 2, and q is an integer of from about 2 to about 4.

4. The method of claim 3 wherein M is a first row transition metal.

5. The method of claim 4 wherein M is copper, nickel, zinc, iron, manganese, chromium, or cobalt.

6. The method of claim 5 wherein the amount of metal cation present in the membrane is from about 2 to about 35 weight percent.

7. The method of claim 6 wherein the feed gas mixture contains at least one of the gases selected from the group consisting of hydrogen, helium, oxygen, nitrogen, carbon dioxide, hydrogen sulfide, methane, and light hydrocarbons.

8. The method of claim 7 wherein the separation factor for carbon dioxide and methane is at least about 10.

9. The method of claim 8 wherein the pressure differential across the membrane is between about 5 to 1000 psig.

10. The method of claim 9 wherein the temperature is between about 0 to 150 degrees Celsius.

11. The method of claim 8 wherein the extent of hydration of the ionomer form of the membrane is at least 30 percent.

* * * * *

UNITED STATES PATENT AND TRADEMARK OFFICE
CERTIFICATE OF CORRECTION

PATENT NO. : 4,741,744

DATED : May 3, 1988

INVENTOR(S) : Marinda L. Wu; Terry D. Gordon; Charles W. Martin

It is certified that error appears in the above-identified patent and that said Letters Patent is hereby corrected as shown below:

Col. 3, line 23, delete the first reference to "to" and insert -- and --;

Col. 4, line 5, delete the hyphen after "$R^3$";

Col. 5, line 12, delete the period in "polymer";

Col. 8, line 3, "SPECIFIC" has been misspelled;

Col. 9, lines 45-53, should read "$\dfrac{cm^3 (STP) cm \times 10^{10}}{cm^2 s\ cm\ Hg}$" ;

Col. 9, lines 63-64, should read "$\dfrac{cm^3 (STP) cm \times 10^{10}}{cm^2 s\ cm\ Hg}$" ;

Col. 10, lines 4-6, should read "$\dfrac{cm^3 (STP) cm \times 10^{10}}{cm^2 s\ cm\ Hg}$" ;

Col. 10, lines 16-17, should read "$\dfrac{cm^3 (STP) cm \times 10^{10}}{cm^2 s\ cm\ Hg}$" .

Signed and Sealed this

Seventh Day of February, 1989

*Attest:*

DONALD J. QUIGG

*Attesting Officer*     *Commissioner of Patents and Trademarks*